United States Patent
Turnbull et al.

(10) Patent No.: US 6,386,713 B1
(45) Date of Patent: May 14, 2002

(54) INDIVIDUAL MIRROR CONTROL SYSTEM

(75) Inventors: Robert R. Turnbull, Holland; Robert C. Knapp, Coloma; Roy E. Vawter, Dorr, all of MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 09/878,022

(22) Filed: Jun. 8, 2001

Related U.S. Application Data

(62) Division of application No. 09/525,391, filed on Mar. 15, 2000, now Pat. No. 6,247,819, which is a continuation of application No. PCT/US97/16946, filed on Sep. 16, 1997.

(51) Int. Cl.[7] ............................................. G02B 5/08
(52) U.S. Cl. ..................... 359/604; 359/605; 359/265
(58) Field of Search ................... 359/604, 605, 359/265, 266, 267, 270, 273; 250/204–205, 201

(56) References Cited

U.S. PATENT DOCUMENTS

| | | | |
|---|---|---|---|
| 4,896,030 A | 1/1990 | Miyaji | 250/201 |
| 4,917,477 A | 4/1990 | Bechtel et al. | 350/357 |
| 5,446,576 A | 8/1995 | Lynam et al. | 359/267 |
| 5,469,296 A | 11/1995 | Ohno et al. | 359/603 |
| 5,486,952 A | 1/1996 | Nagao et al. | 359/603 |
| 5,581,406 A | 12/1996 | Kobayashi et al. | 359/604 |
| 5,610,756 A | 3/1997 | Lynam et al. | 359/267 |
| 5,659,423 A | 8/1997 | Schierbeek et al. | 359/604 |
| 5,691,848 A | 11/1997 | Van Lente et al. | 359/601 |
| 5,812,321 A | 9/1998 | Schierbeek et al. | 359/601 |
| 6,056,410 A | 5/2000 | Hoekstra et al. | 359/603 |
| 6,268,950 B1 * | 7/2001 | Ash et al. | 359/265 |
| 6,302,545 B1 * | 10/2001 | Ascofield et al. | 359/601 |

* cited by examiner

*Primary Examiner*—Mohammad Sikder
(74) *Attorney, Agent, or Firm*—Price, Heneveld, Cooper, DeWitt & Litton; Brian J. Rees

(57) ABSTRACT

A control system for a plurality of electrochromic elements, for example, used in automobiles, to control the glare of the IEC elements used as a rearview mirror (20) as well as the OEC elements (24, 26) used as sideview mirrors (24, 26). The IEC element and each of the OEC elements is provided with an individual drive circuit (21, 22). The drive circuits for the OEC's elements may be customized to account for various factors such as the type of curvature as well as the size and shape. Since individual drive circuitry is provided for the IEC elements and each of the OEC elements, the reflectance of each of the electrochromic elements (20, 24, 26) can be relatively accurately controlled by way of glare signal from inside the automobile.

23 Claims, 10 Drawing Sheets

INDIVIDUAL MIRROR CONTROL SYSTEM

CROSS-REFERENCE TO RELATED APPLICATIONS

This application is a divisional application of U.S. patent application No. 09/525,391, entitled "INDIVIDUAL MIRROR CONTROL SYSTEM," filed on Mar. 15, 2000, by Robert R. Turnbull et al., now U.S. Pat. No. 6,247,819, which is a continuation under 35 U.S.C. §120 of International PCT Application No. PCT/US97/16946, filed on Sep. 16, 1997, the disclosures of which are incorporated herein by reference.

BACKGROUND OF THE INVENTION

The present invention relates to a control system for electrochromic mirrors for use, for example, in automobiles and more particularly to a control system for an inside electrochromic (IEC) mirror and one or more outside electrochromic (OEC) mirrors, which are controlled by a glare signal generated within the vehicle.

Various electrochromic mirror and electrochromic window systems (hereinafter "electrochromic elements") are generally known in the art. Such systems normally include a plurality of electrochromic elements. For example, in automotive applications, electrochromic elements are known to be used for both the rearview mirror and one or more sideview mirrors as well as in window applications for sun load control. It is known that the reflectance of electrochromic elements used as mirrors (or transmittance in the case of electrochromic elements used for window applications) is a function of the voltage applied to the electrochromic element, for example, as generally described in commonly assigned U.S. Pat. No. 4,902,108, which is hereby incorporated by reference. Because of this characteristic, such electrochromic elements are known to be used in systems which automatically control glare from external light sources in various automotive and other applications. In automotive applications, the 12-volt vehicle battery is used as the electrical power source for the electrochromic elements. The electrochromic elements generally operate at a nominal voltage of about 1.2 volts. Since the actual electrochromic element voltages are relatively low compared to the supply voltage, it is known to use a single drive circuit for multiple electrochromic elements. In such applications, the electrochromic elements for the inside and outside mirrors are known to be connected either in series, parallel, or series parallel and driven from a single drive circuit.

In order to prevent damage to the electrochromic elements as well as control their reflectance, the voltage across each electrochromic element must be rather precisely controlled. However, it is known that the resistance of the electrochromic elements may vary as a function of temperature. Thus, in applications with the electrochromic elements being used both inside and outside the vehicle, the temperature difference between the inside and outside electrochromic elements can be relatively significant which can make relatively precise control of the electrochromic elements difficult.

There are other factors which make relatively precise control of the electrochromic elements difficult. For example, in known systems, a glare signal, typically generated within the vehicle, is transmitted by hardwiring to the OEC elements used for the sideview mirrors. The glare signal is used to control the reflectance of the electrochromic elements used for the sideview mirrors. As mentioned above, the OEC elements are normally connected in either series, series parallel, or in parallel with the IEC element used for the rearview mirror assemblies often requiring the voltage to the OEC elements to be scaled or offset. It is known that electrochromic elements typically require a low voltage drive, typically 1.2–1.4 volts to achieve minimum reflectance. As such, a drive voltage accuracy of 0.1 volts or better is required to maintain adequate glare control. Unfortunately, the ground system in an automotive environment can have differences in ground potential exceeding 2.0 volts under some conditions, which can drastically affect the operation of the electrochromic elements. In order to resolve this problem in known automotive applications OEC elements, relatively heavy gauge conductors are typically routed to each of the OEC elements transmission of the glare signal, which increase the cost and weight of installing such a system in an automobile.

There are other problems associated with the relatively accurate control of OEC elements. In particular, OEC elements can be classified according to three major types: flat, convex, and aspheric. The effective magnification or reflectance levels differ for each of the different curvature types. For example, flat mirrors are known to have the highest effective reflectance or magnification (i.e., 1 to 1) while the aspheric and convex mirrors provide relatively lower reflectance (i.e., 1 to 3 and 1 to 4, respectively) depending upon the degree of curvature. The different reflectance or magnification levels of the different OEC element types typically require different drive voltages, thus adding to the complexity of relatively accurate control of the OEC elements. Moreover, OEC elements come in a relatively large array of shapes and sizes which may require different drive voltages to compensate for voltage drops in the various coatings, solution, chemicals, and chemistry, for example, on the larger mirrors.

In order to provide the driver with acceptable glare levels from the IEC mirrors as well as the OEC mirrors, for example, during night driving, the drive voltages to each of the mirrors must be appropriately scaled. Since the IEC and the OEC elements do not share a common thermal environment, it has been relatively difficult if not impossible to correct for temperature-related performance changes in the OEC elements from the inside.

SUMMARY OF THE INVENTION

It is an object of the present invention to solve various known problems in the prior art.

It is yet another object of the present invention to provide a control system for OEC elements wherein the drive voltage for the OEC elements can be relatively accurately controlled.

Briefly, the present invention relates to a control system for a plurality of electrochromic mirrors, for example, used in automobiles, to control the glare level of the IEC elements used as rearview mirrors as well as the OEC elements used as sideview mirrors. The IEC element and each of the OEC elements are provided with an individual drive circuit. The drive circuits for the OEC elements may be customized to account for various factors, such as the type of curvature as well as the size and shape. Since individual drive circuitry is provided for the IEC element and each of the OEC elements, the reflectance of each of the elements can be relatively accurately controlled by way of glare signal generated inside the automobile. More particularly, the individual drive circuits for each of the outside mirrors can be used to scale the drive voltage for each electrochromic element to compensate for differences in the curvature or size as well as temperature of operation of the OEC elements. By providing individual drive circuits for each of the OEC elements, the need for two relatively heavy gauge conductors in order to limit the voltage drop and a ground referenced to the inside mirror and associated drive circuitry is eliminated, thus simplifying the manufacturing process. In particular, in the present invention, the ground voltage does not need to be referenced to the IEC element, thus only one conductor and chassis ground is sufficient. In one embodiment of the invention, the control system is adapted to control all the electrochromic elements to provide a relatively constant level of glare at a predetermined reference point, such as the driver's eye level, from all of the electrochromic elements.

BRIEF DESCRIPTION OF THE DRAWINGS

These and other objects of the present invention will be readily understood with reference to the specification and the following drawings, wherein.

DETAILED DESCRIPTION OF THE PREFERRED EMBODIMENT

Figure 1:
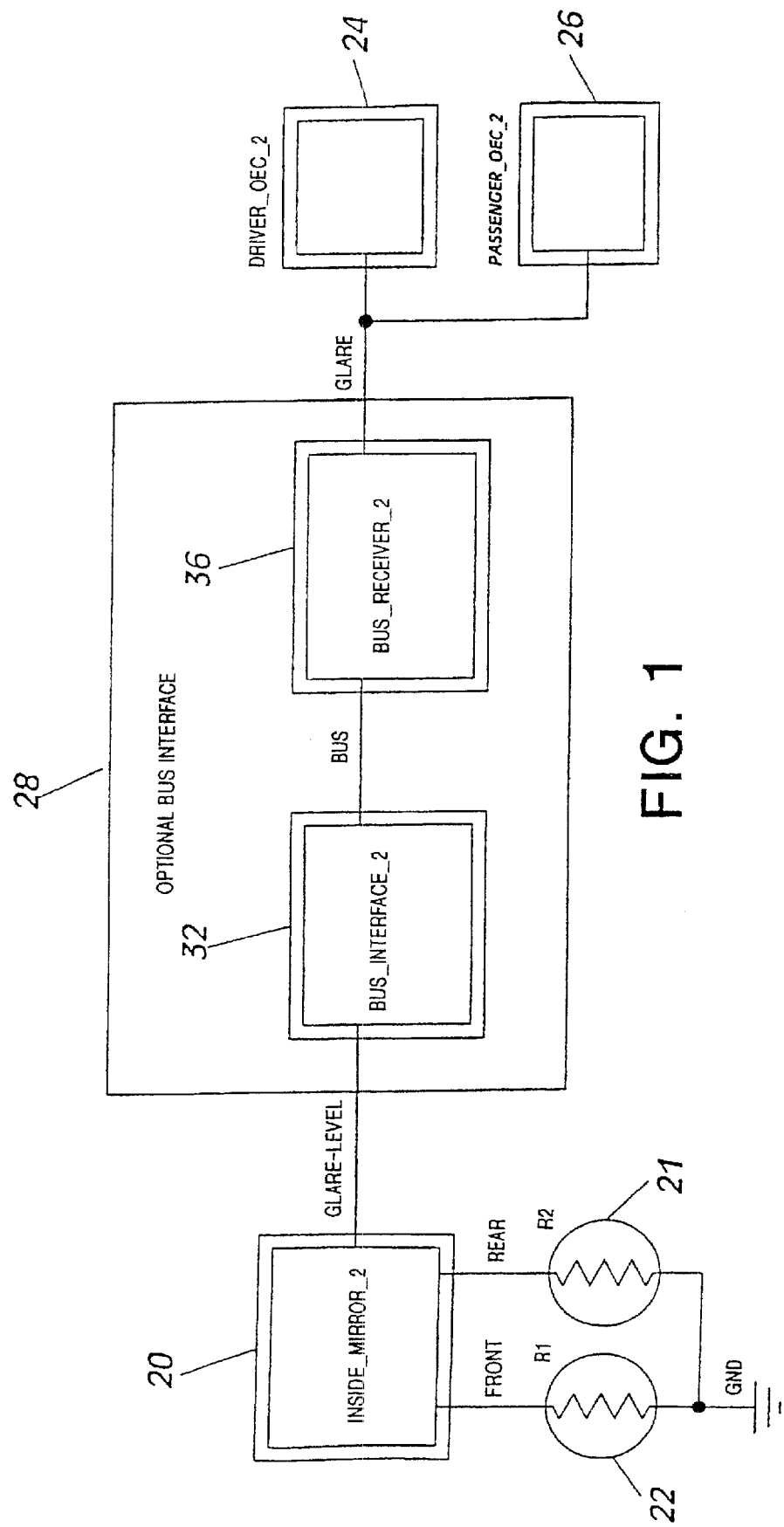
FIG. 1 is a block diagram of the system in accordance with the present invention.

The present invention relates to a control system for electrochromic elements that is particularly useful in automotive applications where an IEC element 20 is used as a rearview mirror and one or more OEC elements 24, 26 are used for the driver and passenger sideview mirrors. An important aspect of the invention relates to the fact that the IEC element 20 and one or more OEC elements 24, 26 are individually controlled. More particularly, in order to solve the various problems discussed above, individual drive circuits are provided for each of the mirrors containing electrochromic elements as opposed to driving the OEC elements, in series, parallel, or series parallel with the IEC element, as is known in the art. The drive circuits for each of the mirrors may be incorporated into the individual mirror assemblies (not shown) to enable the mirrors to be controlled by a glare signal, for example, a pulse width modulated (PWM) signal or digital signal, from inside the automobile.

The glare signal may be developed by a rearward-facing sensor 21 (FIG. 1), such as a photocell, and a forward-facing sensor 22, which may also be a photocell, to provide a glare signal relative to the ambient light level in order to control the reflectance of the electrochromic elements for the IEC 20 and OEC 24, 26 elements. These sensors 21 and 22 are known to be integrated in the inside mirror assembly.

The glare signal is used for driving OEC elements 24 and 26. Since each of the OEC elements 24, 26 is provided with an individual drive circuit, the glare signal may be coupled either directly with the OEC elements 24, 26 or by way of a bus interface, generally identified by the reference numerals 28 (FIG. 1) and 30 (FIG. 2). By providing an individual drive circuit for each of the electrochromic elements 20, 24, 26, the system in accordance with the present invention is adapted to compensate for differences in the thermal environment between the IEC 20 and the OEC 24, 26 elements as well as for differences in the curvatures as well as size of the OEC elements 24, 26. In particular, the glare signal can be scaled to compensate for differences in the curvature, size, and the various coatings used for the OEC 24, 26 elements as well as differences in the thermal environment relative to the IEC element 20. As such, a relatively accurately scaled element voltage may be generated for each electrochromic element that takes into account the size as well as the curvature and even the temperature environment of the OEC elements 24, 26 used for sideview mirrors. This allows automobile manufacturers to stock fewer inside mirror types, each capable of being used with a variety of different types of outside mirrors. Since the outside mirrors are nearly always unique to a particular model of an automobile, the customization of the outside element drive voltages for optimal glare control may be accomplished without an inventory and complexity penalty to the automobile manufacturer. Moreover, since the glare level is transmitted digitally or via a PWM signal, any ground voltage difference will not affect the glare signal at the OEC elements 24, 26, thus allowing the glare signal to be transmitted to the OEC elements 24, 26 using a relatively light gauge wire using a common chassis ground to save cost and weight.

Figure 2:
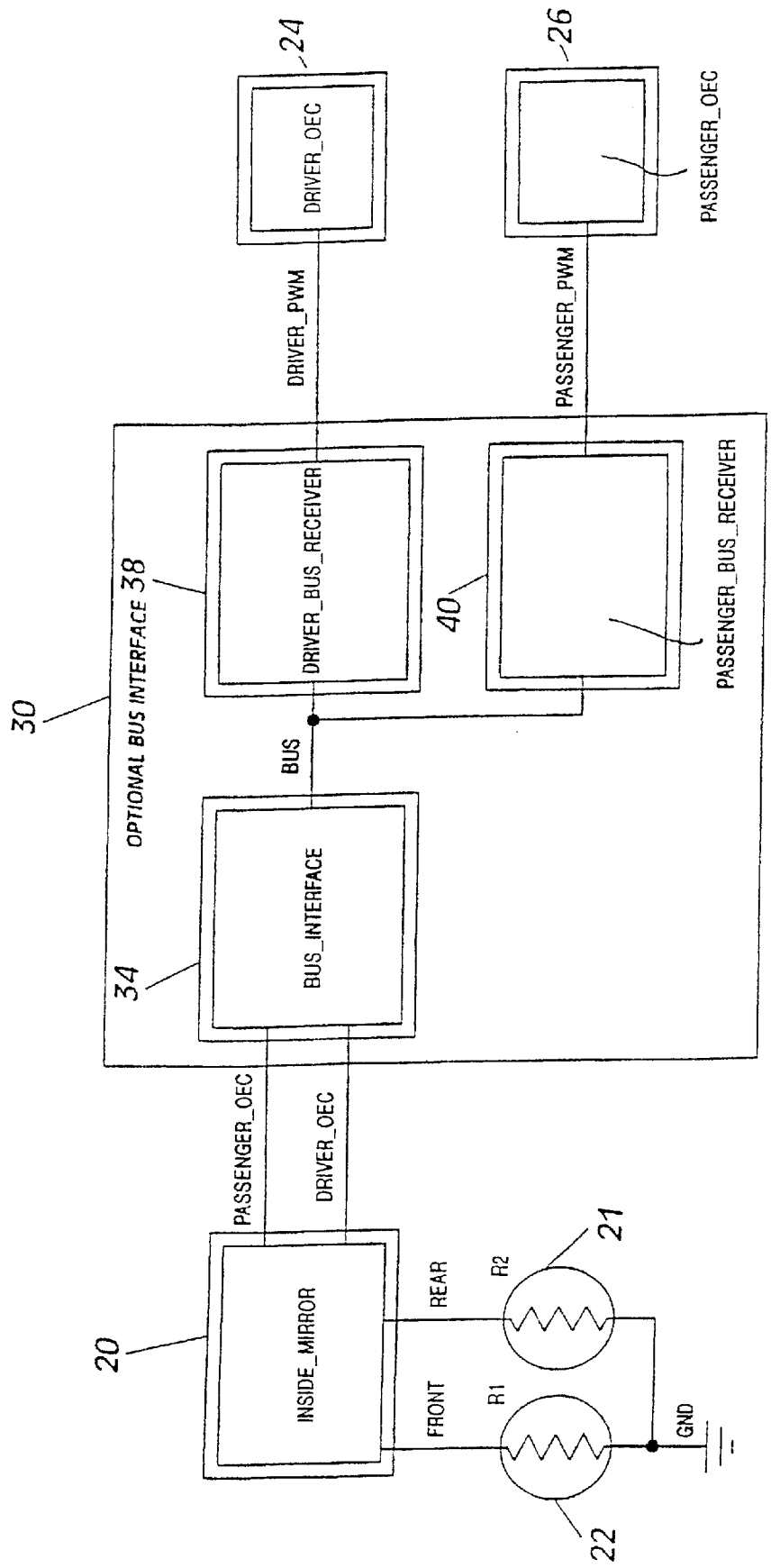
FIG. 2 is an alternate embodiment of the block diagram illustrated in FIG. 1.

FIGS. 1 and 2 show two exemplary embodiments of the invention. In both embodiments, one or more glare signals is transmitted to the outside OEC elements 24, 26, which contain integral drive circuits which can be scaled to provide relatively accurate control of the OEC elements 24, 26 as discussed above. Both embodiments illustrate the use of an optional bus interface, generally identified with the reference numerals 28 and 30. The optional bus interfaces 28 and 30 are merely exemplary and are not required for the practice of the invention. Such bus interfaces 28, 30 normally include a bus interface 32, 34, for example, a Motorola type 68HC705X4 and one or more bus receivers 36, 38, and 40, for example, a Unitrode, model No. UC 5350 bus receiver. In the embodiment illustrated in FIG. 1, the OEC elements 24 and 26 are driven from a common glare signal. Alternatively, in FIG. 2, separate glare signals may be generated for the passenger and driver side OEC elements 24, 26. The separate glare signals may be used to provide additional compensation in applications where convex mirrors are used on the passenger side of the vehicle, which are known to have relatively poor reflectance levels. In such applications, passenger_OEC and driver_OEC glare signals are developed from the rearward and frontward facing sensors 21 and 22. The passenger glare signal passenger_OEC may be scaled to compensate for relatively poor reflectance of the convex mirror. Both signals are applied to the bus interface 34 and, in turn, to a driver bus receiver 38 and passenger bus receiver 40. The driver bus receiver 38 generates a driver_PWM signal used for driving the driver's side OEC 24. Similarly, the passenger_bus_receiver 40 generates a passenger_PWM signal for driving passenger_OEC 26.

Figure 3:
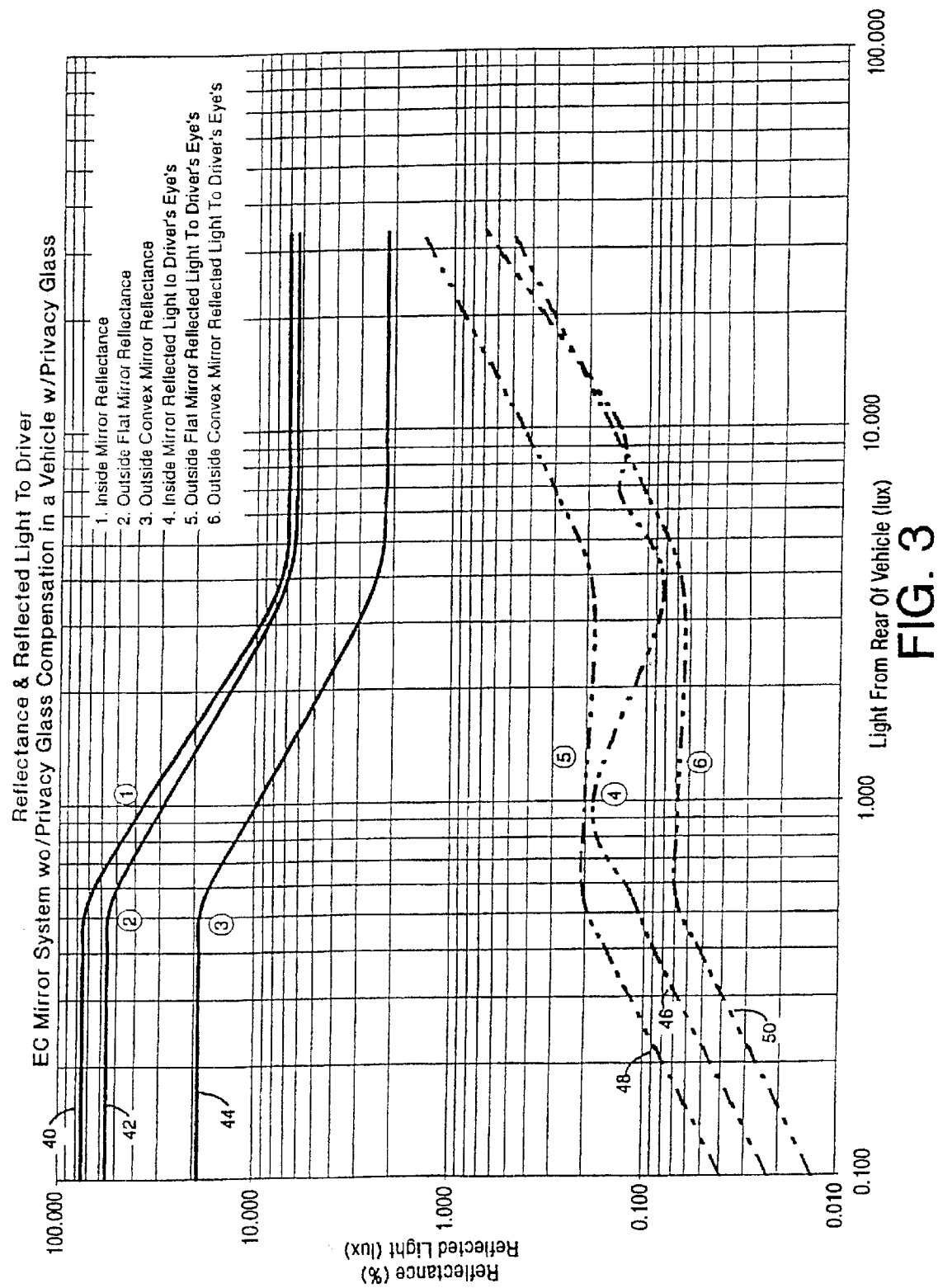
FIG. 3 is a graphical illustration of exemplary reflectance curves illustrating the reflectance of exemplary inside and OEC elements as a function of the light from the rear of the vehicle and also illustrates the reflectance of the electrochromic elements as a function of the reflected light at the driver's eye level.
Figure 4:
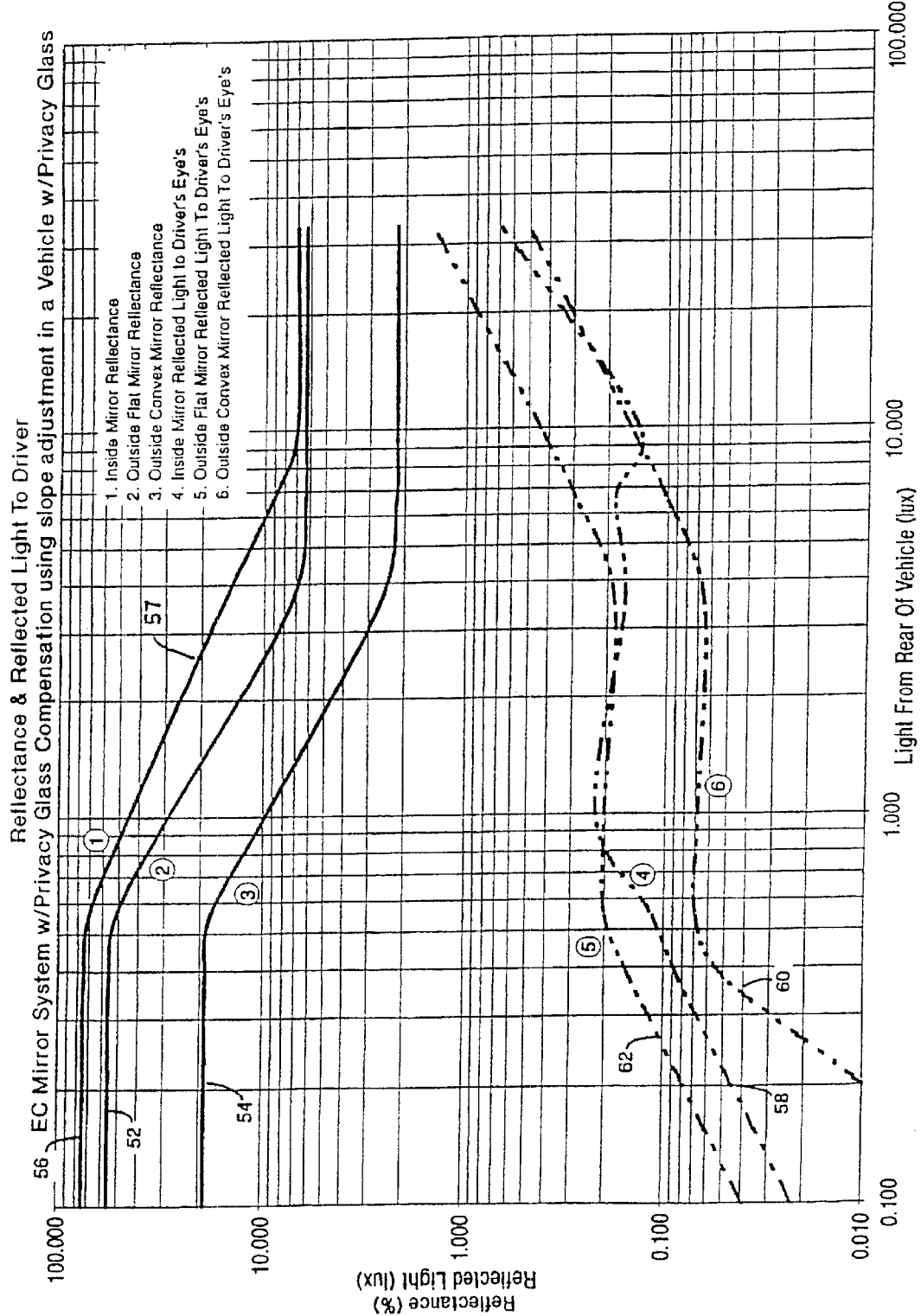
FIG. 4 is similar to FIG. 3, but illustrates compensation of the reflected light using slope adjustment in accordance with one embodiment of the invention.
Figure 5:
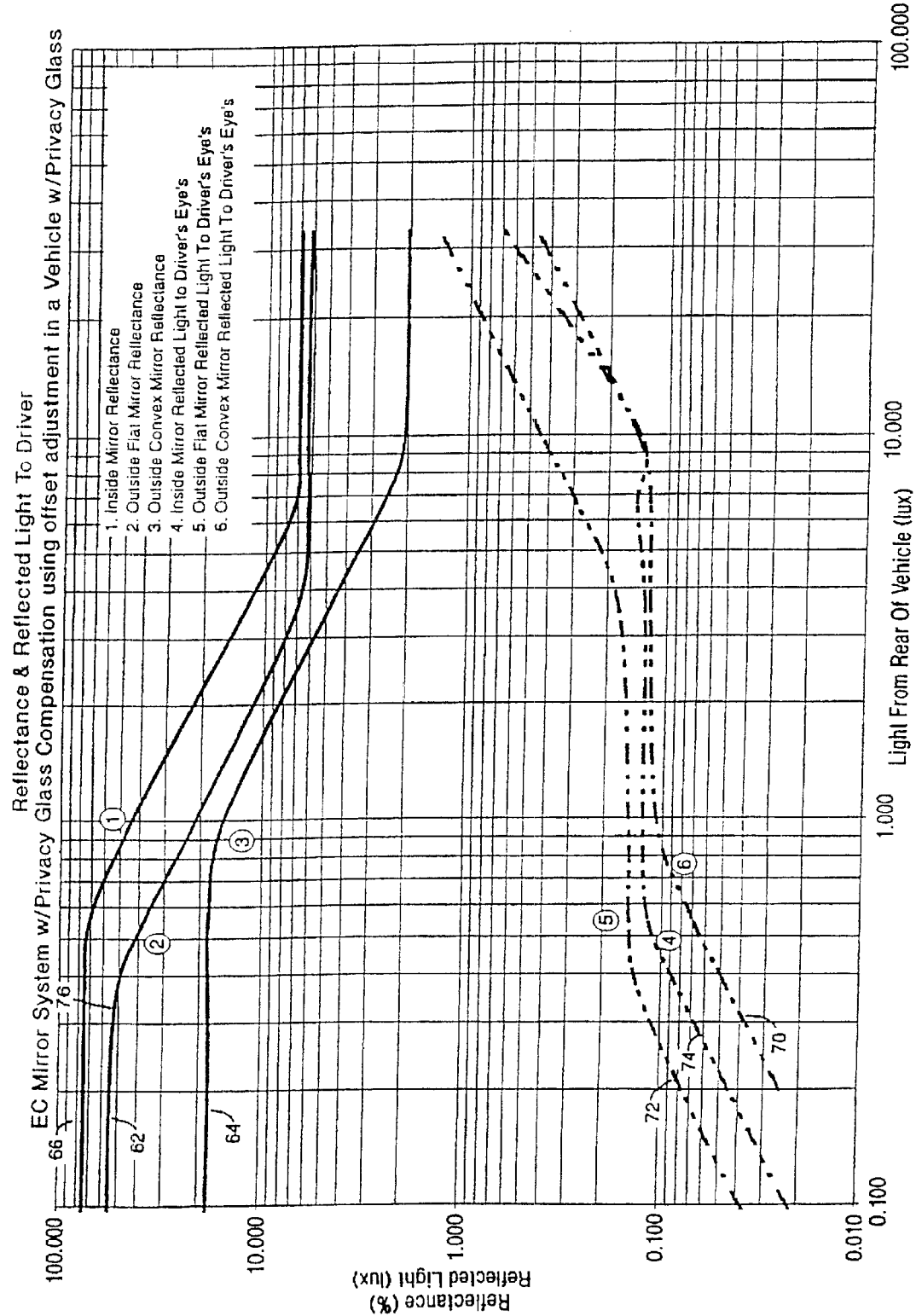
FIG. 5 is similar to FIG. 4 illustrating the difference in reflected light utilizing offset adjustment in accordance with an alternative embodiment of the invention.

The individual drive circuits also enable compensation for environmental factors, such as rear and side window tinting ("privacy glass") and/or front windshield masking. In such applications, due to the environmental factors, the light levels experienced at the respective mirror surfaces may be different at the driver eye level. The curves illustrated in FIGS. 3–5 represent an exemplary application where the transmittance of the rear window is about 30 percent while the transmittance of the side windows is about 70 percent. Exemplary mirrors are used for FIGS. 3–5. The reflectance of the IEC is selected with a maximum reflectance of about 75 percent while the maximum reflectance of the driver's side flat outside mirror is selected to be about 55 percent. The passenger side convex outside mirror is used with a perceived maximum reflectance value of about 18 percent. In particular, for flat mirrors, the measured reflectance levels are the same as the perceived reflectance levels. However, convex mirrors result in a lower perceived reflectance level due to the light diverging from the surface of the mirror. This difference is related to the radius of curvature of the mirror surface as well as the distance of an object from the mirror. As will be discussed in more detail below, the system in accordance with the present invention is able to compensate for these environmental factors in order to force the reflected light from the IEC element 20 as well as the OEC elements 24, 26 to be relatively constant at a predetermined reference point, such as the driver's eye level.

FIG. 3 is an exemplary graphical illustration illustrating the effects of the privacy glass on the reflected light at a predetermined reference point, such as the driver's eye level. The curve 40 represents the reflectance of an IEC element as a function of the light from the rear of the vehicle. The curves 42 and 44 illustrate the reflectance of a flat OEC element and a convex OEC element, respectively, as a function of the light from the rear of the vehicle. As illustrated, all three electrochromic elements are at a maximum reflectance level at relatively low light levels. As the light from the rear of the vehicle increases, the reflectance level of the various electrochromic elements decreases to a minimum reflectance value as shown. The light at the driver's eye level from each of the electrochromic elements is shown by way of the curves 46, 48, and 50. As shown in FIG. 3, the reflectance level of all three electrochromic elements start to decrease with relatively equal light from the rear of the vehicle. All three electrochromic elements also achieved a minimum reflectance at similar light levels. However, as shown by the curves 46, 48, and 50, the reflected light to the driver differs significantly for each electrochromic element. This is shown in FIG. 3 by the different reflectance levels for the three electrochromic elements in the region, for example, between 0.500 lux and 5.000 lux along the curves 46, 48, and 50, which is based upon the forward sensor being exposed to about 1.0 lux. Optimum performance is for the light levels at the driver's eye level to be fairly constant and equal in the range from about 0.500 lux to about 5.000 lux, which represents the active region of the exemplary IEC element 20 and exemplary OEC elements 24 and 26.

FIGS. 4 and 5 relate to different methods in accordance with the present invention for compensating for differences in reflected light at a predetermined reference point, such as the driver's eye level due to, for example, the privacy glass. Referring to FIG. 4, the curves 52 and 54 for the OEC elements 24, 26 are similar to the curves 42 and 44 illustrated in FIG. 3. However, in this embodiment, a characteristic of the reflectance curve for the mirror curve 56 is modified. In particular, the slope 57 in the active region of the reflectance curve for the IEC 20 is decreased. By decreasing the slope, the reflected light to the driver's eye level from both the IEC 20 and driver's side flat OEC elements 24, as represented by the curves 58 and 62, are much closer in the active region of the electrochromic elements than in FIG. 3, for example, in the region between 0.500 lux and about 5.000 lux. However, the slope adjustment does not affect the light at the driver's eye level from the passenger side convex OEC element 26, which, as illustrated in FIG. 4, does not provide light at the driver's eye level close to the driver's side OEC and IEC elements.

FIG. 5 illustrates an embodiment in which the reflected light at a predetermined reference point, such as the driver's eye level, is relatively constant for the IEC 20 as well as for both of the exemplary OEC elements 24, 26. Referring to FIG. 5, the reflectance of the IEC 20 as well as the outside convex OEC 26 is represented by the curves 64 and 66, respectively, which are similar to the curves 40 and 44, respectively. In this embodiment, a characteristic of the reflectance curve for one of the OEC elements is altered. In particular, the offset of the driver's side flat OEC 24 reflectance is varied. In this embodiment, the point generally designated with the reference numeral 76, at which the flat outside mirror starts to decrease in reflectance, is offset as shown. By offsetting the point at which the mirror starts to decrease in reflectance, the reflected light levels from all three electrochromic elements at the driver's eye level will be approximately the same.

As should be clear in FIGS. 3–5, the privacy glass compensation results in relatively constant light levels for the IEC element 20 as well as the OEC elements 24, 26 at a predetermined reference point, such as the driver's eye level. Although specific examples for compensation for reflected light levels at the driver's eye level for exemplary IEC and OEC elements are discussed herein, the principles of the invention are not so limited. In particular, the principles of the present invention may be used to control virtually any combination of electrochromic elements in applications with and without privacy glass and virtually any reference point in automobile and non-automobile applications.

Figure 6:
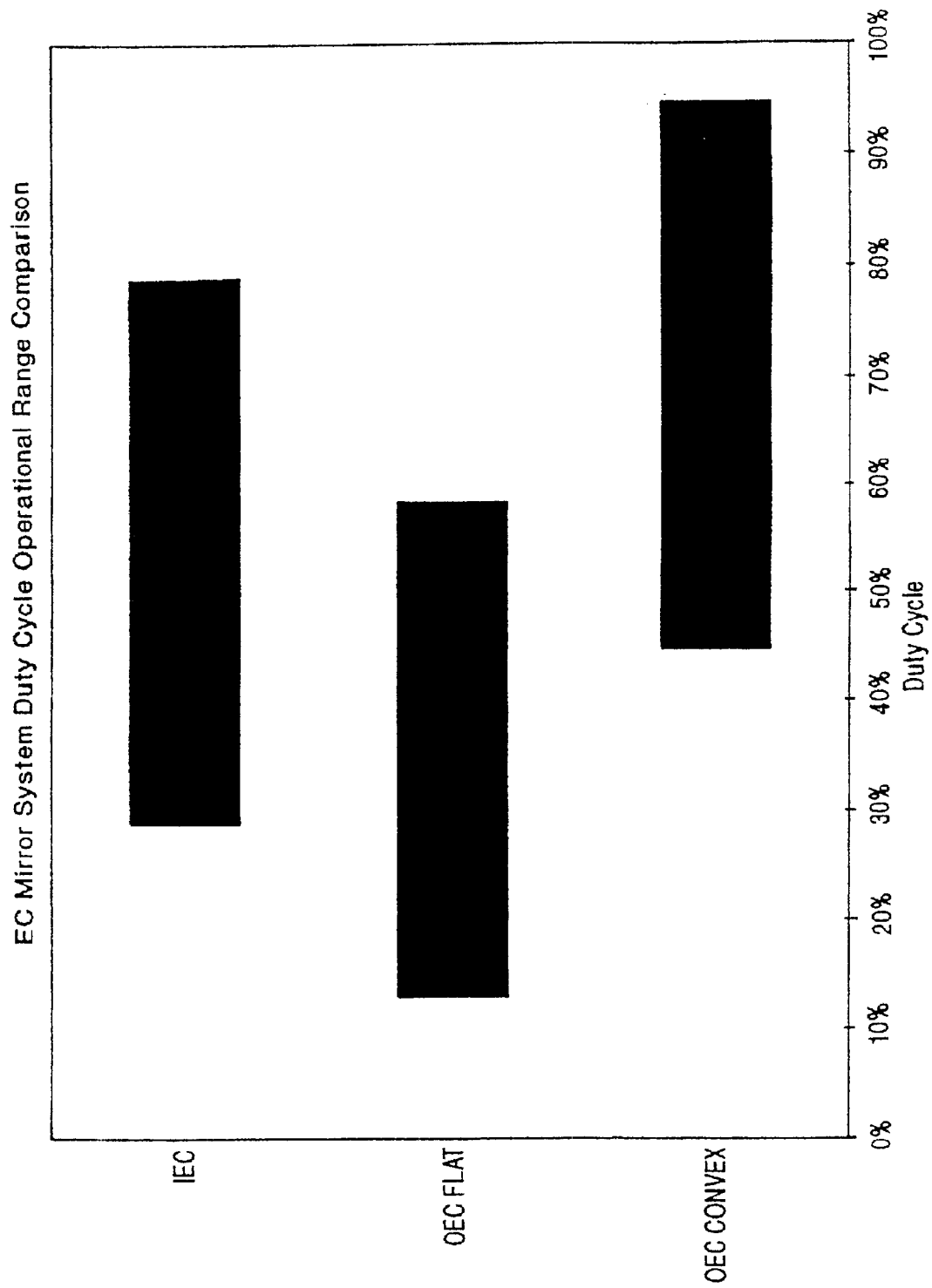
FIG. 6 is an exemplary graphical illustration showing the duty cycle for different types of OEC elements relative to an exemplary IEC element.

As mentioned above, the electrochromic elements are controlled, for example, by a PWM signal. The reflectance level of the particular electrochromic element, aside from the slope and offset adjustment discussed above, is varied by varying the duty cycle of the PWM signal. Exemplary duty cycles for an IEC element 20, flat OEC element 24 and a convex OEC element 26 are illustrated in FIG. 6. As shown, the IEC element 20 responds (dims) when the duty cycle reaches about 30 percent of its control range and may be fully dimmed when the duty cycle reaches approximately 80 percent. A flat OEC element 24, due to its lower reflectance level and the transmission rate of the driver's side window, needs to respond (dim) when the duty cycle reaches 15 percent and be fully dimmed when the duty cycle reaches about 60 percent. However, a convex OEC element 26, due to its perceived reflectance level, may not need to respond (dim) until the duty cycle reaches 45 percent and may be fully dimmed when the duty cycle reaches 95 percent. By designing the electrochromic elements, such that their operational response to the duty cycle, is based on the location of the electrochromic elements on the vehicle and the path that the light takes to reach the electrochromic elements, the IEC element 20 and the OEC elements 24, 26 may be controlled to maintain a relatively constant level of reflected light at a predetermined reference point, such as the driver's eye level.

Figure 7A:
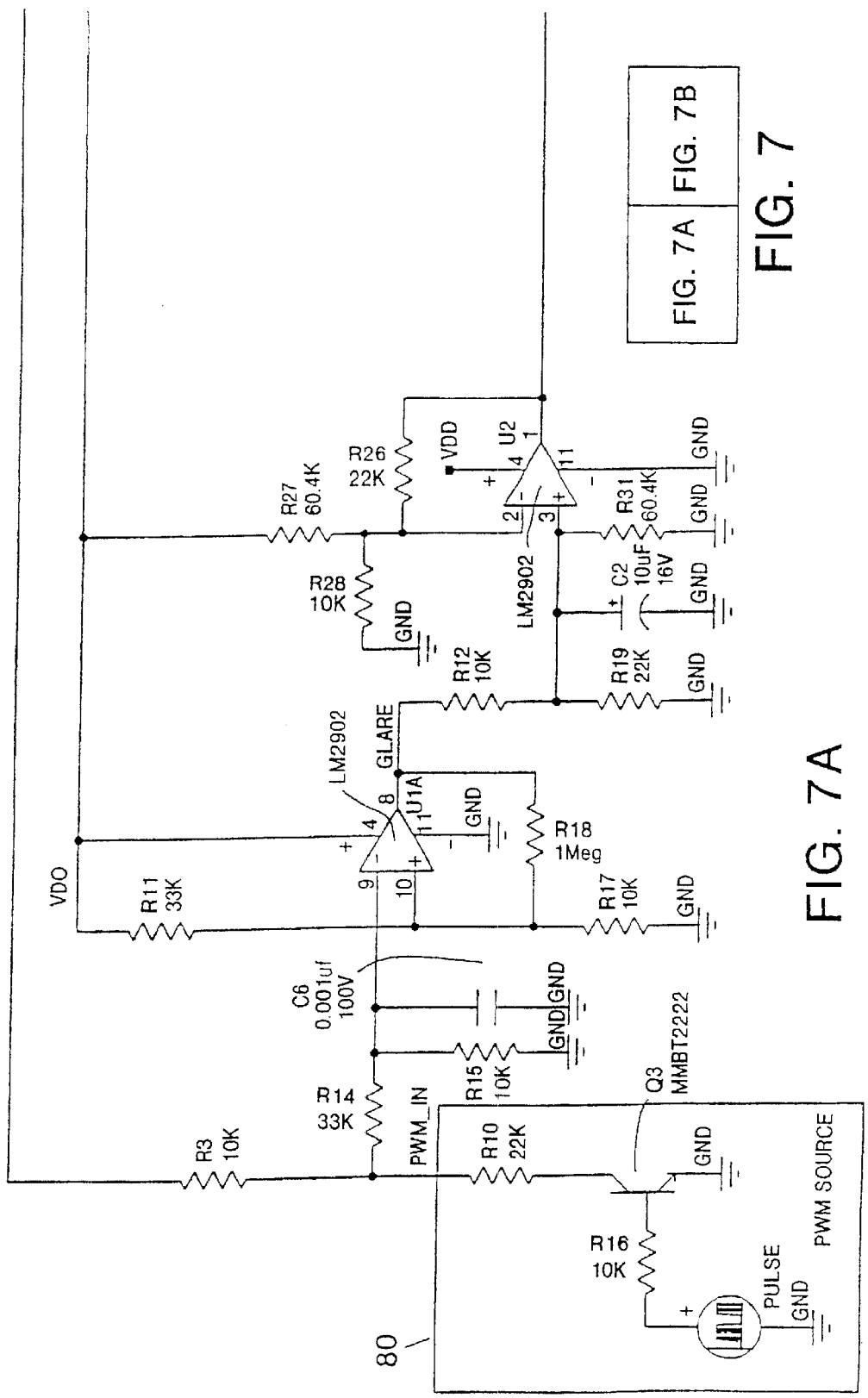
FIG. 7 is an exemplary schematic diagram of a drive circuit for an electrochromic element for use with the present invention.
Figure 7B:
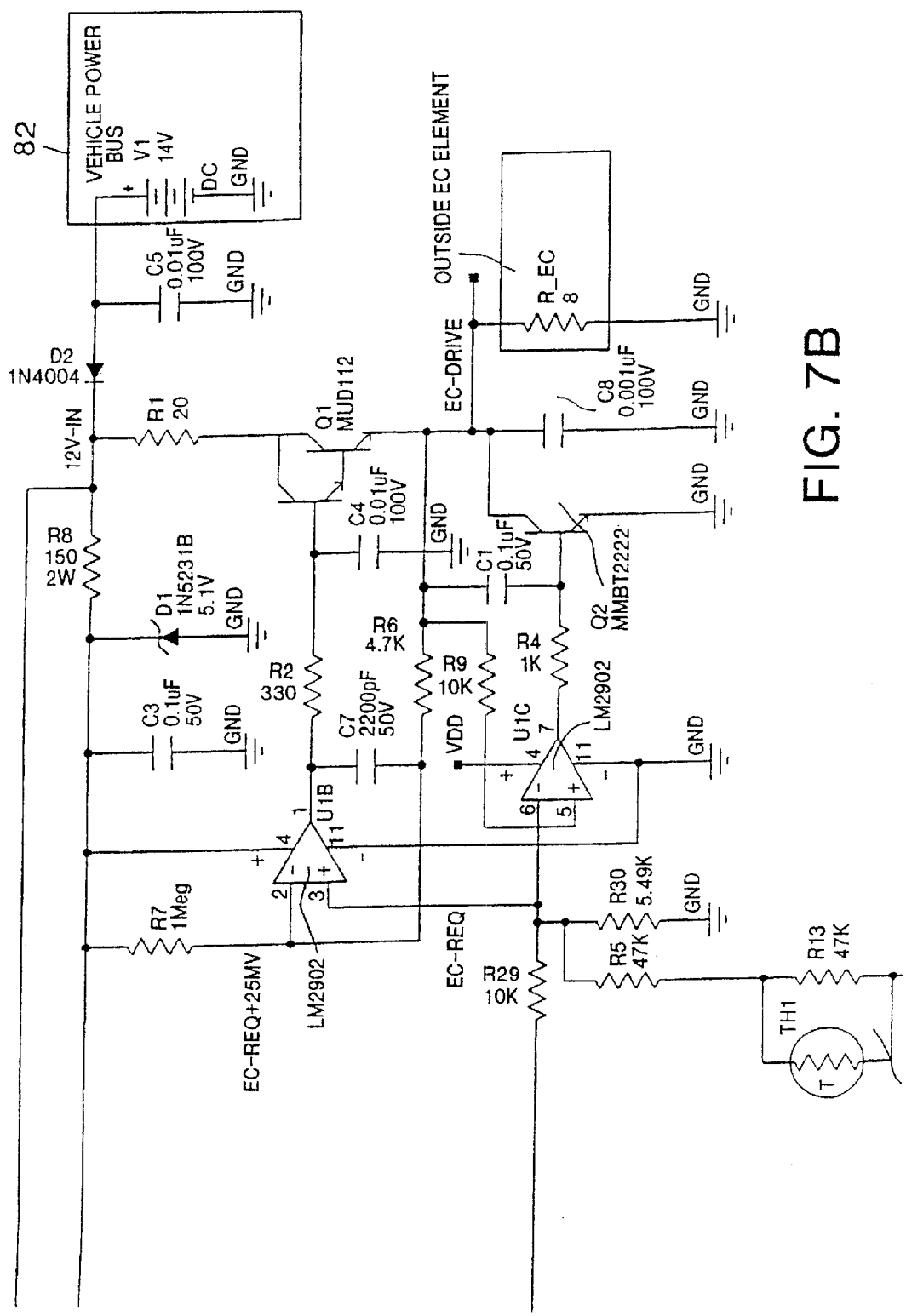
Figure 8:
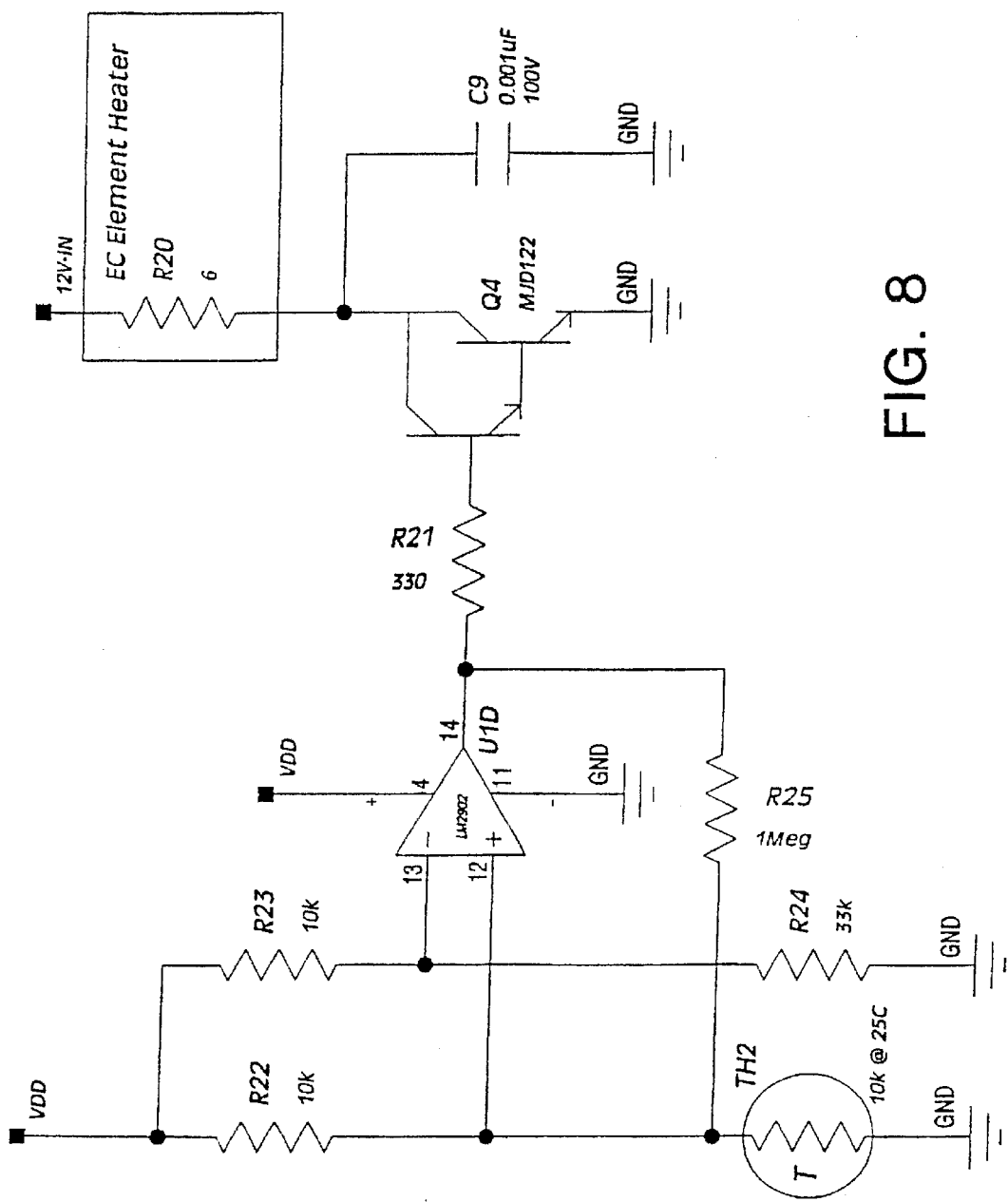
FIG. 8 is an exemplary schematic diagram of a drive circuit for an element heater for an electrochromic element in accordance with the present invention.

Various electronic drive circuits are suitable for use with the present invention. FIG. 7 is an exemplary schematic of a drive circuit for an electrochromic element while FIG. 8 represents an exemplary drive circuit for an optional element heater for an electrochromic element for use with the present invention. Other drive circuits for the electrochromic elements are considered to be within the broad principles of the invention.

Referring first to FIG. 7, the resistors R10, R16, and the transistor Q3 are used to simulate a pulse width modulated signal PWM_IN, which represents the glare level control signal. These components R10, R16, and Q3 do not form part of the electronic drive circuit for the electrochromic element in accordance with the present invention, generally identified with the reference numeral 80. As mentioned above, the electronic drive circuit 80 is powered by the nominal 12-volt vehicle battery 82. A resistor R8 along with the Zener diode D2 form a Zener regulated supply $V_{DD}$ as well as provide a reference for the difference amplifiers U1 and U2. A capacitor C5, connected between the positive terminal of the battery 82 and ground, provides electromagnetic interference (EMI) bypassing. A diode D2, connected with its anode to the positive terminal of the battery and its cathode connected to the 12-volt supply 12V_IN, provides reverse polarity protection. R3, R14, R15, C6, U1A, R11, R17, and R18 form a comparator circuit to eliminate ground and amplitude errors in the PWM glare signal from the inside mirror assembly. In some cases, where a bus receiver is located physically close to the OEC assembly, this section may not be required.

The PWM signal PWM_IN is applied to an inverting terminal of a difference amplifier U1A by way of resistor R14. The resistor R14, together with a resistor R15, connected between the inverting terminal of the difference amplifier U1A and ground, form a voltage divider to prevent the PWM_IN signal from exceeding the common mode range of the difference amplifier U1A. A resistor R3, coupled to the 12-volt supply 12V_IN, is used to pull up the PWM signal PWM_IN. A capacitor C6 is connected between the inverting terminal of the difference amplifier U1A and ground to provide a filtering and radio frequency (RF) immunity.

A reference voltage supply is applied to the non-inverting terminal of the difference amplifier U1A. In particular, a pair of resistors R11 and R17 are used to form a voltage divider to create a reference voltage U1A at the non-inverting input of the difference amplifier U1A. A feedback resistor R18, connected between the output and the non-inverting input of the difference amplifier U1A, provides hysteresis in order to improve the noise immunity of the difference amplifier U1A.

The output of the difference amplifier U1A is a glare control signal GLARE which has two states: nominally 0 and 3.4 volts, and is proportional to the glare level sensed and transmitted by the inside mirror assembly. A capacitor C2 is coupled between the noninverting input of the difference amplifier U2 and ground to average the PWM signal to provide a DC glare signal EC-REQ, which is proportional to the duty cycle.

Figure 9:
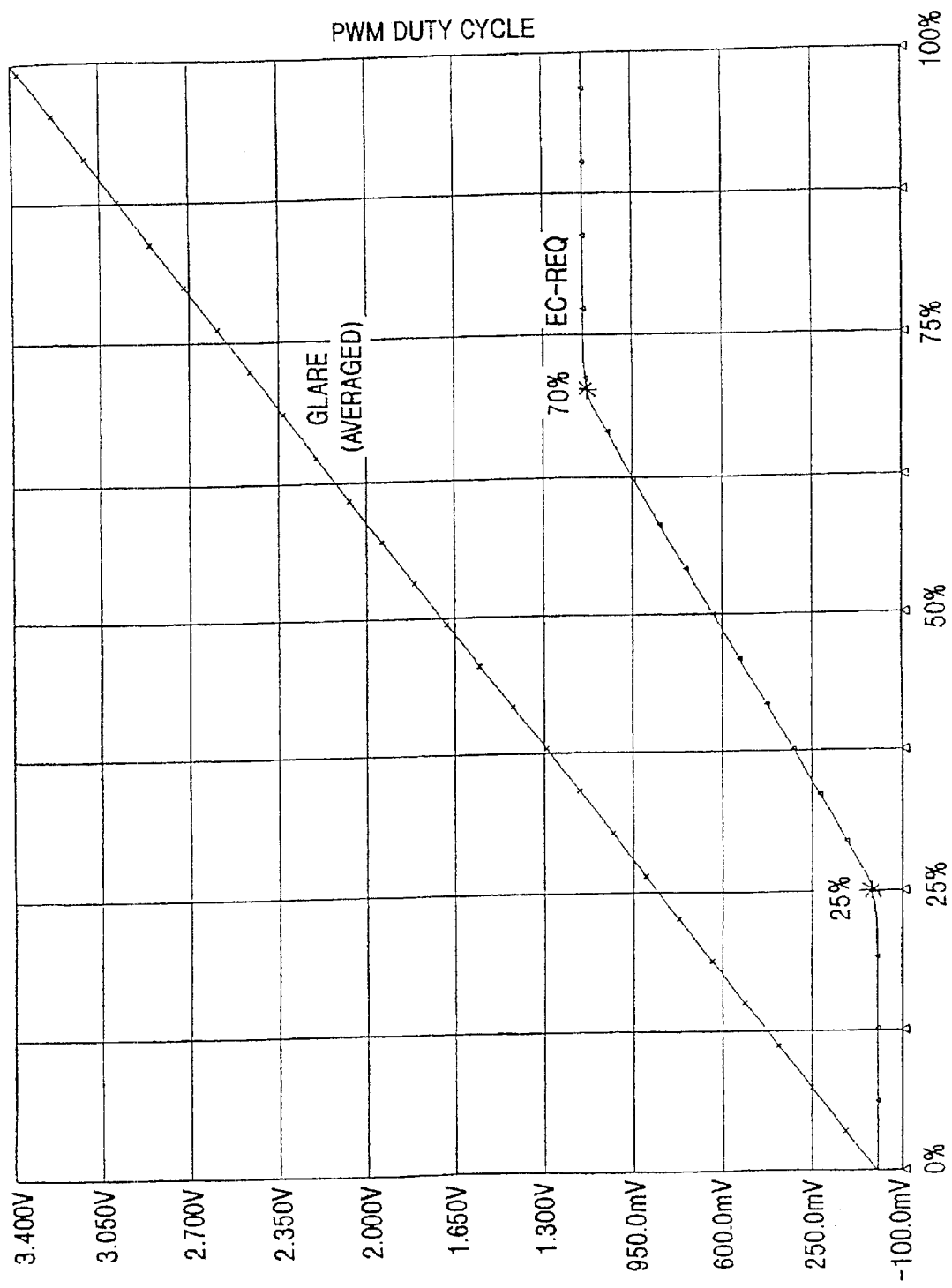
FIG. 9 is a graphical illustration of an exemplary slope and offset adjustment in accordance with the present invention illustrating the duty cycle in percent on the horizontal axis and the averaged glare signal GLARE and element voltage EC-REQ in volts on the vertical axis.

The glare signal GLARE is applied to a slope and an offset adjust circuit which includes a difference amplifier U2 and a plurality of resistors R12, R19, R26, R27, R28, and R31 and a filter circuit using C2. The gain or slope of the reflectance curve of the electrochromic element is set by the ratio of the resistors R26/R28, which is identical to the ratio of the resistors R19/R12. The slope may be selected as discussed above such that the reflected light at the driver's eye level is relatively the same for the inside and outside electrochromic mirrors. With the values shown in FIG. 7, the slope is such that the maximum element voltage is reached at about 70 percent duty cycle of the GLARE signal as illustrated in FIG. 9.

The resistors R27 and R31 are used to adjust the offset as discussed above. A negative offset may optionally be added by the resistors R27 and R31 to hold the electrochromic element voltage EC-DRIVE at about 0 volts until a minimum duty cycle is achieved. With the values shown in FIG. 7, the electrochromic element voltage will remain at about 0 volts until a duty cycle of 25 percent is reached as illustrated in FIG. 9.

The output of the difference amplifier U2 is scaled by a pair of resistors R29 and R30, which establish the maximum element voltage so that for a full scale output, the electrochromic element voltage is 1.2 volts, for example. Optional temperature compensation may be provided for the glare signal EC-REQ by way of a pair of resistors R5 and R13 and a thermistor TH1 in order to provide increased drive voltage at low temperatures to improve the response time.

A pair of difference amplifiers U1B and U1C are used to drive the drive transistors Q1 and Q2 to either drive or short the electrochromic element R_EC depending on the difference between the voltage EC_REQ, the DC glare signal, and the electrochromic element voltage EC-DRIVE. If the electrochromic element voltage EC-DRIVE exceeds the glare signal voltage EC_REQ, the difference amplifier U1C will go high, thereby turning on the drive transistor Q2, which shunts the electrochromic element R_EC, which, in turn, discharges the electrochromic element causing its reflectance to increase. The voltage at the output of the difference amplifier U1C will stabilize at that point required to cause the drive transistor Q2 to sink just enough current to match the EC-DRIVE and the EC_REQ signals.

A resistor R4, connected to the output of the difference amplifier U1C, limits the base current to the drive transistor Q2. The combination of a capacitor C1 and a resistor R4 provide high frequency negative feedback to stabilize the U1C–Q2 feedback loop and to reduce EMI. A resistor R9, coupled between the non-inverting input of the difference amplifier U1C and the electrochromic element R_EC, provides electrostatic discharge (ESD) protection for the difference amplifiers U1B and U1C.

If the DC glare signal EC_REQ exceeds the drive signal EC-DRIVE by more than approximately 25 millivolts, for example, the output of the difference amplifier U1B will go high turning on the drive transistor Q1. The voltage at the output of the difference amplifier U1B will stabilize at the point required to cause the drive transistor Q1 to source just enough current to match the EC-DRIVE and EC-REQ+25 MV. The resistors R6 and R7 offset the voltage at the inverting input of the difference amplifier U1B by approximately 25 millivolts. Since the resistor R7 is much larger than resistor R6, it behaves more like a current source than as a voltage divider. This causes the largest percentage error when the electrochromic element voltage is near 0V. Since the electrochromic element is clear until its voltage reaches about 0.4 volt, this error is negligible once the element begins to darken. The current supplied by the resistor R7 flows through R6 and adds approximately 25 millivolts to EC-DRIVE signal to produce the signal EC-REQ+25 MV. This offset insures that the drive transistors Q1 and Q2 will not turn on at the same time. A pair of capacitors C7 and C4 control the loop gain of the U1B–Q1 Loop at high frequencies to ensure stability. The resistor R2 connected to the output of the difference amplifier U1B, limits the base current to the transistor Q1 and in conjunction with the capacitor C4, sets a high frequency pole. The combination of the resistor R6 and capacitor C7 sets another high frequency pole. The resistor R6 also provides ESD protection to the comparator U1B. A resistor R1 limits the collector current of the drive transistor Q1.

A capacitor C3 provides a power supply bypass to ensure the stability of the difference amplifier U1. A pair of capacitors C1 and C4, coupled to the drive transistors Q1 and Q2, provide EMI and ESD protection to the drive circuit 80. A resistor R1, disposed in series with the collector of the transistor Q1, reduces Q1's power dissipation.

An optional heater control circuit is illustrated in FIG. 8. A resistor R22 in series with a thermistor TH2 forms a voltage divider with a temperature dependent output. As the temperature drops, the voltage on the comparator U1D increases. A pair of resistors, R22 and R23, connected between the power supply $V_{DD}$ and the non-inverting and inverting inputs of the difference amplifier U1D, respectively, form a voltage divider with a fixed reference output at the inverting input of the difference amplifier U1D.

The output of the difference amplifier U1D will go high when the mirror temperature drops below, for example, 0° C., turning on the transistor Q4 to activate a mirror element heater, represented as the element R20. A resistor R25 connected between the output and the non-inverting input of the difference amplifier U1D provides hysteresis. A resistor R21 connected between the base of the drive transistor Q4 and the output of the difference amplifier U1D limits the base current into the drive transistor Q4. A capacitor C9 provides for EMI protection for the circuit.

While the invention has been described with reference to details of the embodiments shown in the drawings, these details are not intended to limit the scope of the invention as described in the appended claims.

The invention claimed is:

1. A system for controlling reflectance levels of an inside rearview mirror and at least one outside rearview mirror of a vehicle having a rear window made of privacy glass, the system comprising:
  a glare sensor for sensing the level of light received from behind the vehicle, and for generating a glare signal representing the sensed light level; and
  a control subsystem electrically coupled to the inside and outside rearview mirrors and said glare sensor for receiving said glare signal and for generating electrical signals to control the reflectivity of each of the inside and outside rearview mirrors, said control subsystem controls the reflectivity of the inside rearview mirror differently than that of the at least one outside rearview mirror to compensate for the privacy glass of the rear window.

2. The system of claim 1, wherein said control subsystem includes a controller and individual drive circuits for each mirror, said individual drive circuits are coupled to said controller.

3. The system of claim 1, wherein said glare sensor is mounted inside the vehicle such that light received from behind the vehicle projects through the privacy glass of the rear window before reaching said glare sensor.

4. The system of claim 3, wherein said glare sensor mounted in a housing of the inside rearview mirror.

5. The system of claim 1, wherein said control subsystem includes a controller coupled to the glare sensor and individual drive circuits for each mirror, said individual drive circuits are coupled to said controller.

6. The system of claim 5, wherein each of the mirrors includes a housing and wherein said individual drive circuits are mounted in the respective housings.

7. The system of claim 6, wherein said controller is mounted in the housing of the inside rearview mirror.

8. The system of claim 1, wherein said control subsystem controls the reflectivity of the mirrors such that the reflected light at a predetermined reference point is relatively constant.

9. The system of claim 1, wherein said control subsystem controls the reflectivity of each of the mirrors based upon a reflectance curve associated with each mirror, the reflectance curve establishes a relationship between sensed glare levels and desired reflectivity levels, wherein the reflectance curve for the inside rearview mirror has at least one different characteristic than the reflectance curve of the outside rearview mirror.

10. The system of claim 9, wherein said different characteristic is the slope.

11. The system of claim 9, wherein said different characteristic is the offset.

12. A rear vision system for a vehicle, the vehicle having a rear window made of privacy glass, the rear vision system comprising:
  an outside rearview mirror for mounting to the outside of the vehicle, said outside mirror having a reflectivity that varies in response to an electrical control signal;
  an inside rearview mirror for mounting to the inside of the vehicle to reflect light entering through the privacy glass of the rear window towards the eyes of the driver, said inside mirror having a reflectivity that varies in response to an electrical control signal;
  a glare sensor for sensing the level of light received from behind the vehicle, and for generating a glare signal representing the sensed light level; and
  a control subsystem electrically coupled to said inside and outside rearview mirrors and said glare sensor for receiving said glare signal and for generating electrical signals to control the reflectivity of each of said inside and outside rearview mirrors, said control subsystem controls the reflectivity of said inside rearview mirror differently than that of said outside rearview mirror to compensate for the privacy glass of the rear window.

13. The rear vision system of claim 12 and further including a second outside rearview mirror for mounting to the exterior of the vehicle, said second outside mirror having a reflectivity that varies in response to an electrical control signal.

14. The rear vision system of claim 12, wherein said glare sensor is mounted inside the vehicle such that light received from behind the vehicle projects through the privacy glass of the rear window before reaching said glare sensor.

15. The rear vision system of claim 14, wherein said glare sensor mounted in a housing of said inside rearview mirror.

16. The rear vision system of claim 12, wherein said control subsystem includes a controller coupled to said glare sensor and individual drive circuits for each mirror, said individual drive circuits are coupled to said controller.

17. The rear vision system of claim 16, wherein each of said mirrors includes a housing and wherein said individual drive circuits are mounted in the respective housings.

18. The rear vision system of claim 17, wherein said controller is mounted in the housing of said inside rearview mirror.

19. The rear vision system of claim 12, wherein said control subsystem controls the reflectivity of said mirrors such that the reflected light at a predetermined reference point is relatively constant.

20. The rear vision system of claim 12, wherein said control subsystem controls the reflectivity of each of said mirrors based upon a reflectance curve associated with each mirror, the reflectance curve establishes a relationship between sensed glare levels and desired reflectivity levels, wherein the reflectance curve for said inside rearview mirror has at least one different characteristic than the reflectance curve of said outside rearview mirror.

21. The rear vision system of claim 20, wherein said different characteristic is the slope.

22. The rear vision system of claim 20, wherein said different characteristic is the offset.

23. The rear vision system of claim 12, wherein each of said mirrors are electrochromic mirrors.

* * * * *